March 14, 1961   H. G. TWIFORD   2,974,722
TIRE MOUNTING TOOL

Original Filed Nov. 15, 1956   2 Sheets-Sheet 1

INVENTOR.
Harry G. Twiford
BY
ATTORNEYS

INVENTOR.
Harry G. Twiford
BY

ATTORNEYS

United States Patent Office 2,974,722
Patented Mar. 14, 1961

2,974,722
TIRE MOUNTING TOOL

Harry G. Twiford, 777 S. Adams St., Denver 9, Colo.

Original application Nov. 15, 1956, Ser. No. 622,303, now Patent No. 2,925,857, dated Feb. 23, 1960. Divided and this application May 15, 1959, Ser. No. 813,446

4 Claims. (Cl. 157—1.22)

This invention relates to tire-mounting tools and a method of mounting a tire on a wheel, and more particularly to tools for and a method of mounting pneumatic tires on drop-center wheels in such a manner that the bead of the pneumatic tire does not touch the rim of the wheel as it is being placed on the wheel.

This application is a divisional application of my co-pending application Serial No. 622,303, filed November 15, 1956, for Tire Mounting Tool, now Patent No. 2,925,857.

Tubeless tires have recently become standard equipment on new automobiles and have largely replaced tires requiring an inner tube to hold the air. Since there is no tube used with such tubeless tires, the contact between the tire bead and the wheel rim is critical since this connection may be a major source of leak of air from the tire. The mounting and dismounting of tubeless tires from wheels must be done with extreme caution since any nick or crease on the tire bead will disrupt the seal and will cause a leak between the two members. With the very recent trend of the use of smaller wheels, the mounting and dismounting of tires from such small wheels becomes extremely difficult and many tires are ruined with the tools now available. It is readily seen that in reducing the diameter of the opening of the tire one inch, the circumferential extent is reduced by over three inches. The reduction in size makes the mounting and dismounting of the smaller tires on the smaller wheels extremely difficult, since it has actually reduced the total amount of stretch which is necessary to permit the tire bead to pass over the rim of a wheel. Also, the majority of the smaller wheels have a very sharp rim, and in mounting a tire, the rim frequently cuts and nicks the bead.

According to the present invention, I have discovered a tire-mounting structure which includes a bead-holding member and a bead-dropping member which are arranged to operate on a wheel rim for dropping a tire bead over the rim into the drop center of the wheel without having the tire bead touch the wheel rim during the mounting operation. The tire-mounting tool provides smooth surfaces over which the bead of the tire may pass without contacting the tire bead with the sharp edges of the rim or subjecting the bead impact tools commonly used in placing a bead over the rim of a wheel. The tire-mounting structure quickly and effectively drops the bead over the rim of the wheel with a simple rotary movement of a bead-dropping mechanism around the rim of a wheel.

Included among the objects and advantages of the present invention is a tire-mounting structure which is arranged to simply and effectively drop a bead over the rim of a wheel without permitting the tire bead to touch the rim of the tire during the mounting operation. The invention includes a method of mounting a tire on a wheel so that the tire bead does not contact the rim during the operation. The device provides an effective mechanism for mounting a tire on a wheel without impact tools and without cutting or nicking the beads of the tire. The tire-mounting structure provides a plurality of smooth surfaces over which a tire bead may be dropped across the rim of a wheel into mounted position on a wheel. The tire-mounting structure, also, provides a pick-up mechanism which picks up the bead of a tire being mounted, places it in position to drop over the rim of a wheel and a effectively preventing the tire bead from coming into contact with the wheel rim during the mounting operation.

These and other objects and advantages of the present invention may be readily ascertained by referring to the following description and the appended illustrations in which.

In a common tire-mounting process, a wheel is placed in substantially horizontal position, and a tire to be mounted thereon is placed on top of the wheel. One side of the lower bead of the tire is placed over the upper rim of the wheel, and then by various mechanisms the bead of the tire is progressively forced over the remaining part of the rim so that the tire bead is under the rim of the wheel. The construction of the wheel and the tire is such that the rim of the wheel is substantially larger than the diameter of the opening of the bead of the tire, so that when the tire is mounted on the wheel the bead of the tire may rest laterally or axially against the rim of the wheel and be held thereon. The process is repeated with the upper bead, passing it over one section of the rim of the wheel and then progressively forcing the remainder of the bead of the tire over the rim into the drop center of the wheel.

Figure 2:
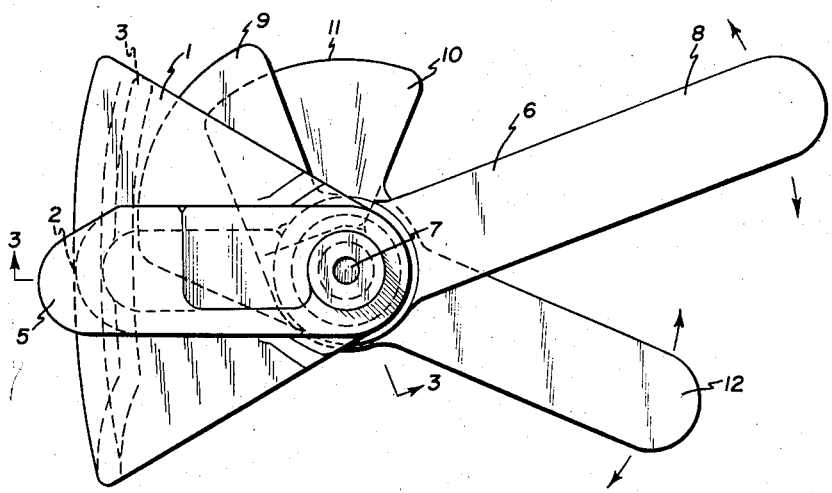
Fig. 2 is a top plan view of a bead-holding mechanism of the structure.
Figure 3:
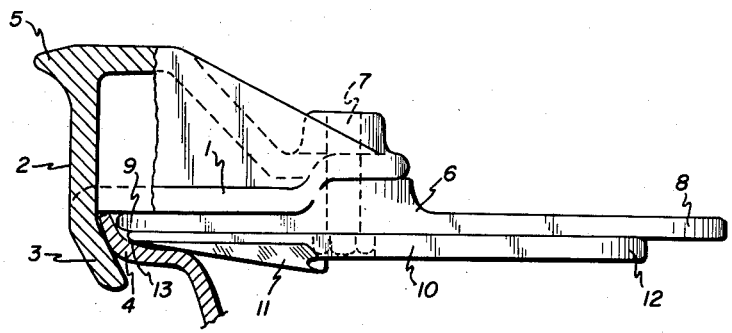
Fig. 3 is a partial cross-sectional view of the bead-holding mechanism taken along section line 3—3 of Fig 2.
Figure 4:
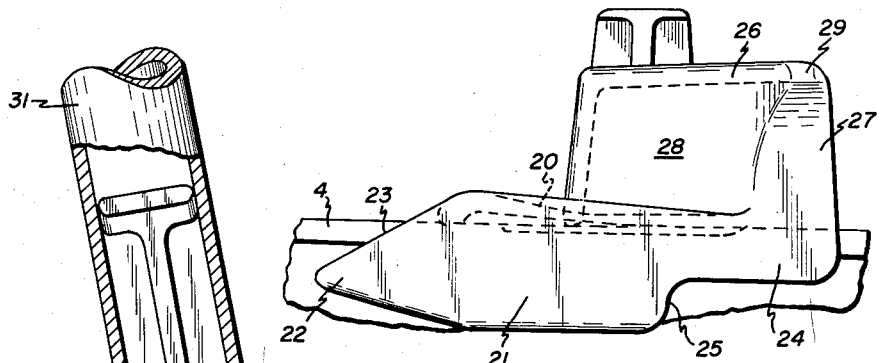
Fig. 4 is a side-elevational view of a bead-dropping mechanism.

The device illustrated in Fig. 2 is a bead-holding mechanism which is arranged to be attached to the rim of a wheel and hold a segment of a bead of a tire stationary and in the drop center while the remaining part of the bead is progressively passed over the rim of the wheel. The holding mechanism includes a body portion 1 which is arranged to lie on a rim and radially of a wheel on which it is mounted. An integral axial or lateral surface 2 extends upwardly from the body. A lower inwardly biased surface 3 which is arranged to hook over the rim 4 of a wheel is connected to the body. An upper bead stop 5 is provided which prevents the axial movement of the bead away from the rim of the wheel during the mounting process. The body is securely attached to the rim 4 by means of a rim-gripping cam 6 pivotally mounted on the body by means of a pivot mount 7. The rim-gripping device includes a handle portion 8 and a connected cam surface 9 which moves into and out of contact with a rim by movement of the handle portion 8. With the portion 3 hooked over the rim 4, the handle 8 is moved in counterclockwise direction so that the cam surface 9 engages the rim and securely locks the body 1 thereon. Since the flanges on the rims of the wheel are not uniform, a leveling cam is provided which includes an axially-directed cam surface 11 and a handle 12 pivoted on the pivot 7. With the surface 3 hooked over the rim 4 and the locking cam 9 in place against a rim, the leveling cam 10 is also moved counterclockwise so that the surface 11 securely locks the cam 9 with the horizontal surface 13 of the rim. When a tire is being placed on a wheel, a very great force is exerted on the stop due to pull of stretching the tire bead in attempting to place it on the rim, and the leveling device prevents the bead stop from tilting and being pulled off the rim.

Figure 5:
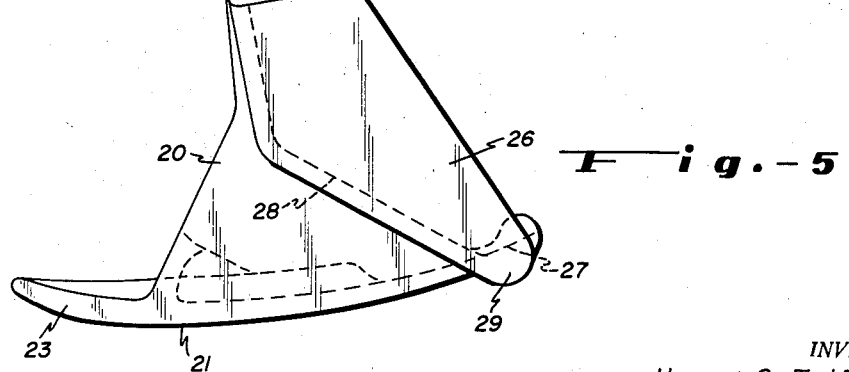
Fig. 5 is a top plan view of a bead-dropping mechanism.

The bead-dropping assembly of the tire-mounting structure is illustrated in Fig. 5. The dropping structure includes an arcuate body 20 which is arranged to seat substantially horizontal on a horizontally-held wheel, and a rim-hooking portion or flange 21 extending laterally from the body and arcuately curved to correspond generally to the arc of the rim of a wheel. The portion 21 ends in a pointed member 22 at one end, which is arranged to ride generally below the edge of the rim 4, and the upper, diagonal, connecting surface 23 between the point 22 and the surface 21 extends upwardly into the body 20. The width of the surface 21 is reduced at the rear portion 24 thereof, and a shoulder 25 interconnects the two portions. An axially-extending portion 26 extends upwardly from the body 20 and it includes a front upright surface 27 and a diagonal bead-guiding surface 28 which extends from the upright surface 27 above the portion 24 rearwardly of the device. A radially-extending stop 29 is mounted above the upright surface 27 and is arranged to prevent axial movement of the tire bead away from the wheel rim. A handle mount 30 extending rearwardly of body 20 provides means for mounting a handle 31 thereon.

Figure 1:
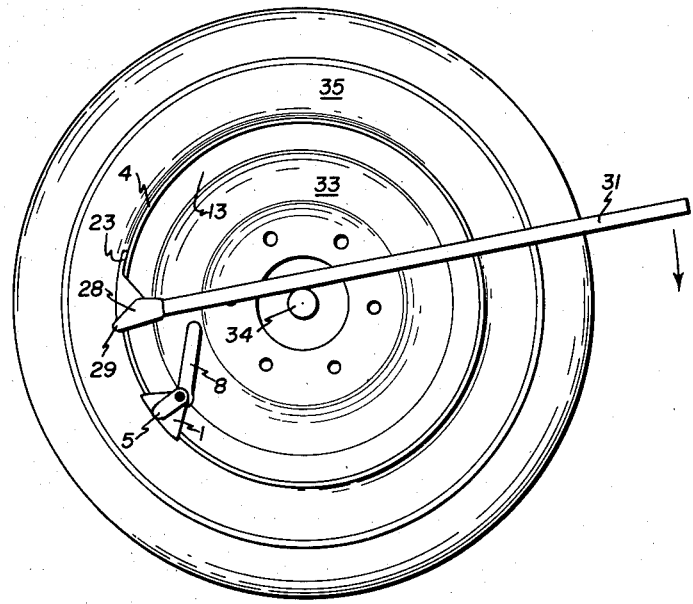
Fig. 1 is a top plan view of the two tire-mounting tools in initial position on a pneumatic tire wheel.

In operation of the tire mounting assembly, illustrated in Fig. 1, a wheel, shown generally by numeral 33, is mounted in substantial horizontal position over an upright center post 34, such as is commonly used on many tire-changing machines. The bead stop is locked on the rim 4 of the wheel and a tire, shown in general by numeral 35, is placed on the wheel with the lower bead hooked over the upright section 2 of the stop. The bead drop device is then placed on the rim 4, with the portion 21 hooked over the rim, at a point on the rim closely spaced to the stop. The lower bead of the tire is placed on the body 20 adjacent the upright surface 28, along the upright 27 and under the bead stop 29. The handle 31 is then moved in a clockwise rotation so that the surface 28 moves along the lower tire bead forcing it across the upright 27, down across the body 20 onto the lower surface 24 and subsequently into the drop center of the wheel. The bead drop mechanism is rotated around the wheel to progressively drop the bead of the tire over the rim into the drop center. As the bead is prevented from moving by the stop, and since it is held by the upright 2, the bead at that point is adjacent but does not touch the rim. The bead follows along surface 28, down over the surface 24 into the drop center of the wheel and the bead is thus placed over the rim without touching the rim during the mounting operation. The movement of the bead-drop is continued around the rim until it is closely adjacent the other side of the stop at which point the bead of the tire will be completely in the drop center of the wheel. The bead drop is then removed, again placed on the other side of the stop and the upper bead of the tire is then placed in a similar position on the stop 1 and on the body 20 against the diagonal surface 28. The handle 31 is again rotated in a clockwise direction, dropping the upper bead of the tire into the drop center of the wheel. When the bead drop mechanism is on the other side of the stop, the upper bead of the tire will be in position in the drop center of the wheel and the tire is mounted. In both cases of mounting the bead over the rim of the wheel, the bead is moved across smooth surfaces of the tire mounting mechanism without touching the rim during the mounting operation, thereby reducing substantially the possibility of damage to the bead.

The bead stop may be utilized in holding a bead stationary on a rim while placing the bead in the drop center of a wheel, utilizing most types of tire-mounting equipment; however, the unique ability to drop the bead over the rim of the wheel without touching the rim during the operation is not achieved without the use of the bead-drop tool of the invention. Likewise, the bead-drop tool may be used without the stop during the mounting operation, but the benefit of passing the bead over the rim without touching the same is not achieved without the combination of the two devices which shield the rim as the bead is dropped thereover.

While the invention has been illustrated by reference to specific devices, there is no intent to limit the scope or the spirit of the invention to the precise details so set forth, especially as the preferred form shown is a simplified form with the mounting tool made in two separate pieces, since it is obvious that the two may be joined into the single tool, and also, various means may be utilized to fasten the bead-stop mechanism to the rim of the wheel.

I claim:

1. A new article of manufacture for placing a tire bead over a drop center wheel rim without contacting the same during mounting operation, comprising a substantially thin planar body arranged to slidably seat on and cover a minor portion of a wheel rim and having an integral curved portion extending laterally from one side of said planar body in position to hook over a rim, a portion projecting from said curved portion beyond said body including a pointed portion arranged to ride below a rim, a lateral upstanding wall portion diagonally projecting from the other side of said planar body and extending to an edge of said planar body, said upstanding wall arranged to guide a tire bead onto said curved portion, the end of said curved portion opposite said pointed portion terminating below and rearwardly of said upstanding wall so as to place a bead in the drop center of a held wheel, and means for mounting a manipulating member on said body for rotating the same around a rim.

2. Structure for placing the beads of pneumatic tires over the rim of drop center wheels without contacting such rims during mounting, comprising a substantially planar body for slidably engaging the side of the rim, an upstanding wall portion diagonally extending across one side of said body, a gently curved portion depending from the opposite side and extending along substantially one entire edge of the body in position to hook over the edge of the rim and terminating in a pointed portion below said body, the end of said curved portion opposite said pointed portion being terminated below and rearwardly of the point of intersection of said upstanding wall with said curved portion, and means for mounting a manipulating member on said body for rotating the same around a rim.

3. Structure for placing the beads of pneumatic tires over the rim of drop center wheels without contacting such rims during mounting, comprising a substantially planar body for slidably engaging the side of the rim, an upstanding wall portion diagonally extending across one side of said body a gently curved portion depending from the opposite side and extending along substantially one entire edge of the body in position to hook over the edge of the rim and terminating in a pointed portion below said body, the end of said curved portion opposite said pointed portion being terminated below and rearwardly of the point of intersection of said upstanding wall with the curved portion, a radially extending stop portion mounted on a front upright surface connected to said wall portion, and means for mounting a manipulating member on said body for rotating the same around a rim.

4. The structure as defined in claim 3, in which the radially extending portion is at a point spaced above and beyond a rim on which said structure is mounted.

References Cited in the file of this patent

UNITED STATES PATENTS

| | | |
|---|---|---|
| 786,611 | Threlfall | Apr. 4, 1905 |
| 1,025,987 | Long | May 14, 1912 |
| 2,900,018 | Harrison | Aug. 18, 1959 |

FOREIGN PATENTS

| | | |
|---|---|---|
| 456,097 | France | Aug. 16, 1913 |